Patented Aug. 30, 1932

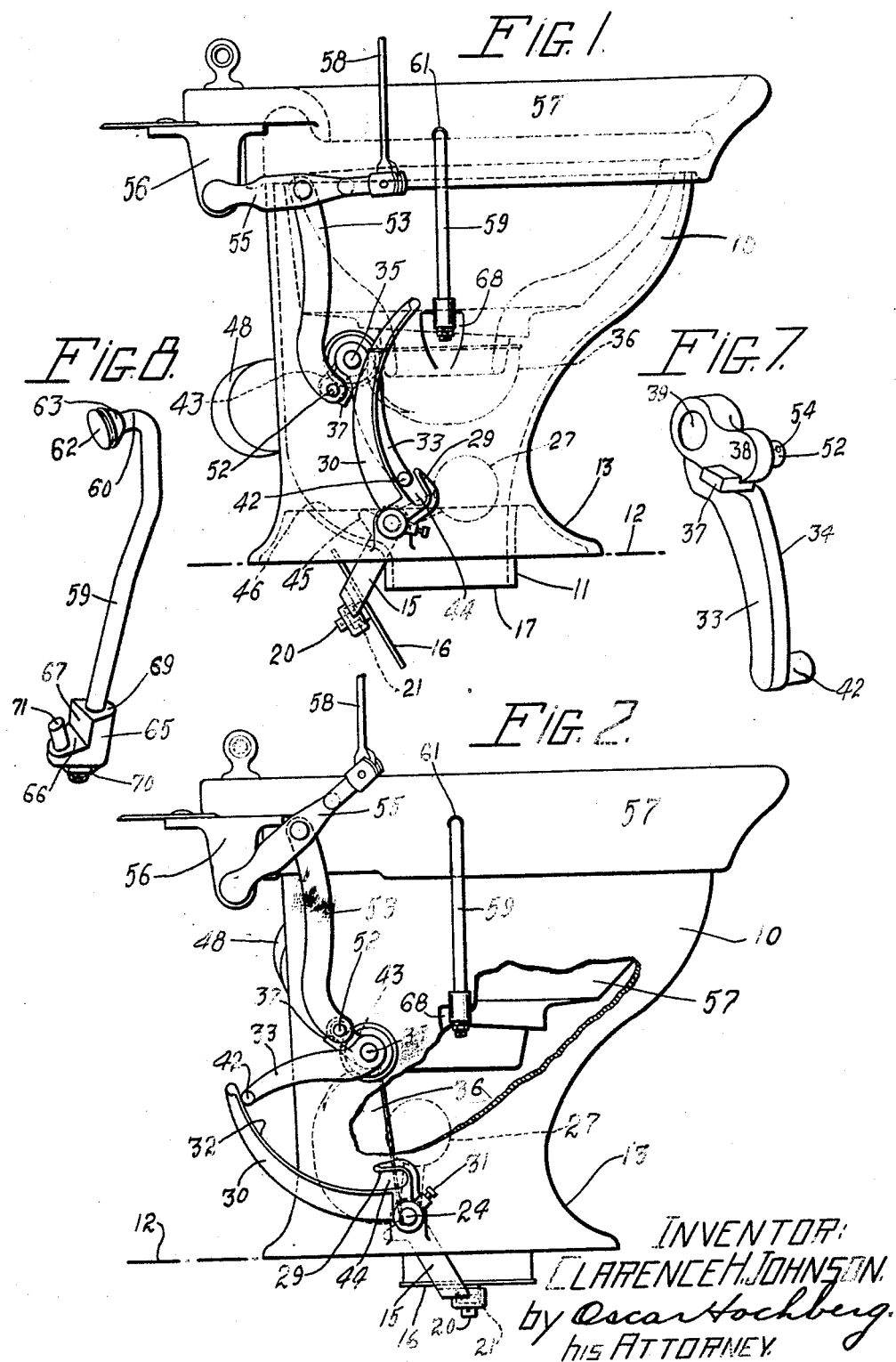

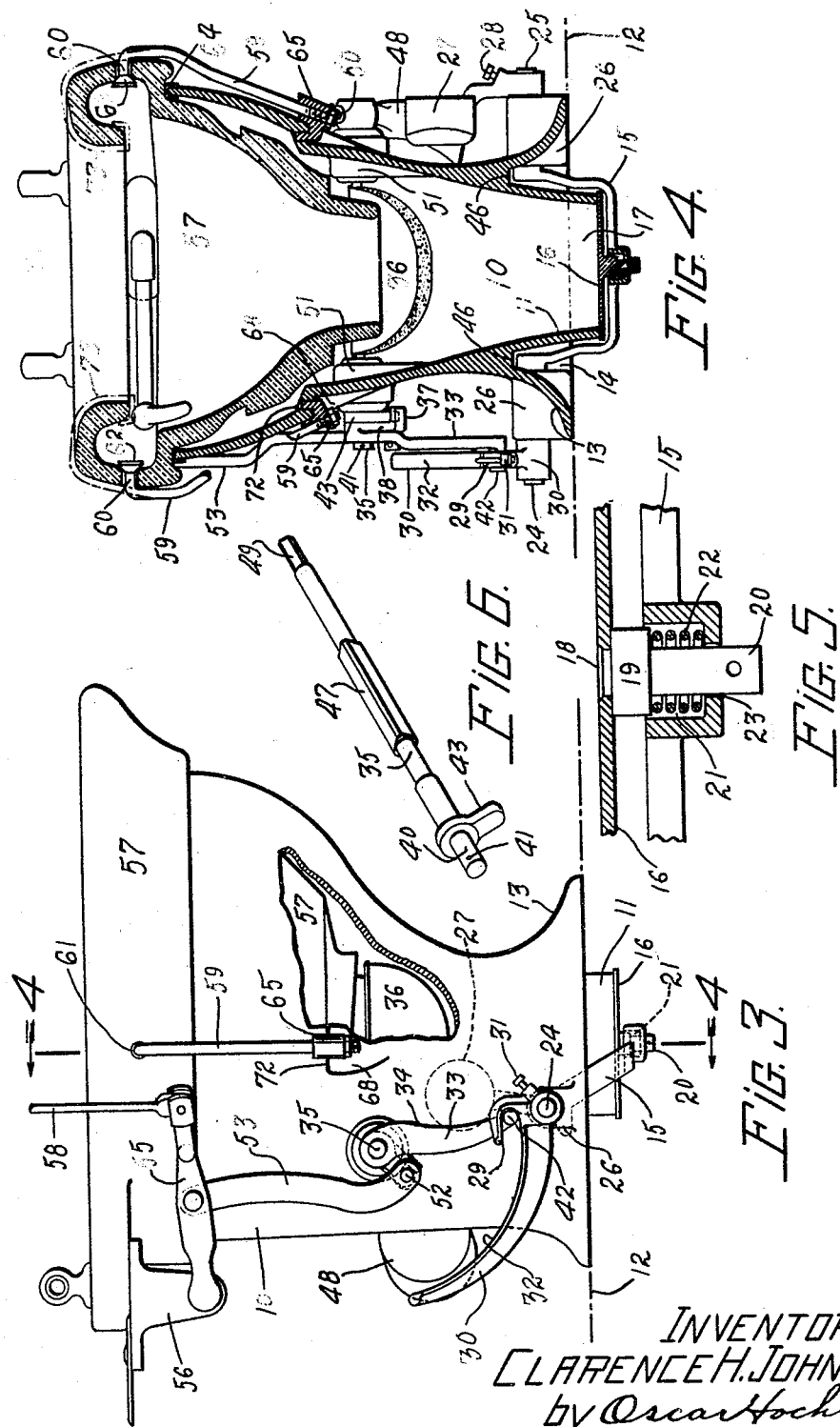

1,875,009

UNITED STATES PATENT OFFICE

CLARENCE H. JOHNSON, OF CHICAGO, ILLINOIS, ASSIGNOR, BY MESNE ASSIGNMENTS, TO PULLMAN CAR & MANUFACTURING CORPORATION, A CORPORATION OF DELAWARE

WATER CLOSET

Application filed November 14, 1930. Serial No. 495,631.

The invention relates generally to water-closets of the type employing upper and lower dumping pans and primarily adapted for use in passenger-train cars.

The invention involves the use of operating mechanism designed to effect initial closing of the lower pan before the dropping of the upper pan and the return movements of the pans in reverse sequence; that is to say, the opening movement of the lower pan is delayed until the upper pan has been restored to its normal closed position.

Specifically, the invention contemplates the use of operating mechanism designed to delay the dropping movement of the upper pan until the lower pan has reached its initial closed position, and then to permit the upper pan to be restored to its normal closed position before the lower pan can be released to drop to its normal open position.

The invention further comprehends the restoration of the flushing mechanism to its normal non-flushing condition to prevent draining of the water supply tank in the event that the return of the upper pan to normal closed position is prevented by some obstruction in the hopper.

The principal object of the invention is to provide lost motion mechanism in the connection between the flushing lever and upper pan to prevent simultaneous initial movement of said pan and lever, and a positive connection between said lever and the lower pan, whereby the lower pan would be made instantly responsive to both initial and continued movements of the flushing lever to cause the lower pan to be raised to closed position under the hopper before any downward opening movement of the upper pan can take place.

A further and important object is to provide lost motion mechanism in the connection between the upper pan and the flushing lever so disposed that the lever may be restored to its normal position in the event that the upper pan is prevented from moving upwardly after dumping and the lower pan released to drop to its normal open position.

The foregoing and other objects are attained by the mechanism illustrated in the accompanying drawings, in which Figure 1 is a side elevation of a hopper equipped with the invention, showing the mechanism parts in their normal non-dumping relation;

Figure 2 is a similar view showing the same parts in their full dumping relation, a portion of the stand being broken away to expose the dropped condition of the upper pan;

Figure 3 is a similar view showing the same parts during the initial stage of dumping movement after the lower pan has been raised and immediately before the dropping of the upper pan, a portion of the stand being broken away to show the upper pan in its normal closed position;

Figure 4 is a vertical section transversely of the hopper taken on line 4—4, of Figure 3, showing the lower pan supporting yoke and the clamping means for holding the bowl to the stand.

Figure 5 is a similar view showing the compensating connection between the lower pan and its supporting yoke portion on a larger scale;

Figure 6 is a view in perspective showing the operating and upper pan supporting shaft providing one of the lost motion elements of the mechanism;

Figure 7 is a similar view of the connection between the upper and lower pans of the hopper and constituting another of the lost motion elements of the mechanism; and Figure 8 is a similar view of the adjustable clamp designed to hold the bowl to the stand as best shown in Figure 4.

Heretofore, considerable difficulty has been experienced with double pan hoppers with respect to the timing of the movements of the pans to complete the closing movement of the lower pan before the upper one began dropping at all. The greatest objection to such hoppers arose from the failure of the upper pan to retain its full closed position until the lower pan had fully closed the lower portion of the hopper, or such mechanisms lacked the means for shutting off the water supply in the event that the upper pan failed to return to its normal closed position.

Thus an interval of time in the cycle of pan movement was reached during which both pans were so positioned relatively to their respective hoppers that direct communication was established for a sufficient length of time to expose the user to blasts of air from beneath the car and subjecting the person to sprays of water and other matter carried by the air currents. Efforts have been made to overcome these evils by elaborate systems of timing devices employing complicated leverages for delaying the operation of the upper pan until the lower one had been raised, but the high cost of such installations and difficulty of operation resulting from the relatively small leverages available rendered such mechanisms impracticable for use in railway cars.

The invention embodies the customary stand 10 terminating in the usual discharge spout 11 below the floor 12 of the vehicle and provided above the floor with a supporting base 13 flared outwardly from the discharge spout portion. The space 14 thus provided is utilized for housing the arms of a pivotally mounted yoke 15 supporting a lower pan 16 controlling the discharge spout opening 17. The pan is yieldably supported upon the base of the yoke 15 to permit adjustment upon the yoke to compensate for possible variations in the peripheral edge of discharge spout 11 to insure a proper seal at this point. For this purpose a pin 18, having an enlarged collar 19 and depending shank portion 20, is rigidly secured to the pan and entered in pocket 21 in the base of the yoke. A coil spring 22 is nested in the pocket and surrounds shank 20 of the pin which is guided for vertical movement in opening 23 in the bottom of pocket 21. The collar portion 19 of the pin rests upon spring 22 and is guided in its movements by the walls of the spring pocket 21 to prevent undue tilting of the pan 16 supported upon it.

In the present embodiment, the yoke 15 is pivotally secured to the stand 10 by means of a pair of stud shafts 24 and 25 tapped into the arms of yoke 15, and journaled in bosses 26 formed on the flared supporting base 13, as best shown in Figure 4. The shafts are fastened rigidly to the arms of the yoke and function to transmit movement to the yoke and pan 16 in a manner presently to appear. To shaft 25 is fixed a counterweight 27 firmly secured to the shaft by set screw 28 and disposed with its center of gravity to one side of the center of rotation of shafts 24 and 25 and in position tending at all times to hold lower pan 16 normally open as shown in Figure 1.

For the purpose of establishing control of the movements of the lower pan 16 by the operation of the flushing mechanism hereinafter to be described, a tracker arm 30 having a return portion 29 at its base is fixed to companion shaft 24 and adjustably held to it by set screw 31 or like fastening device. To positively lock the lower pan 16 in its raised position during the dumping operation, the upper face 32 of tracker arm 30 is preferably curved to present an extended thrusting face to operating lever 33 on bell crank 34 when in the position shown in Figure 2 during the first stage of the flushing movement. The tracker arm functions to progressively increase the leverage upon the yoke 15 as the operating lever 33 traverses thrusting face 32 of the tracker arm, whereby less power is required to maintain the lower pan 16 in raised position as operating lever 33 approaches the free outer end of the tracker arm, as best shown in Figure 2.

Bell crank 34 is loosely journaled upon shaft 35 controlling the movements of upper pan 36 and constitutes one of the elements of the lost motion connection. The crank is provided with a stop lug 37 projecting laterally from the lower side of arm 38 extending at an angle to lever 33 as shown in Figure 7, and is formed with a journal portion 39 adapted to ride upon bearing 40 on shaft 35 and held from disengagement by pin 41. To insure positive engagement between tracker arm face 32 and bell crank 34, the operating lever 33 is formed at its free end with a laterally extending terminal bearing portion 42 to prevent possible lateral displacement of one or the other of these parts.

In its normal position of rest as indicated in Figure 1, the terminal bearing 42 on operating lever 33 of the bell crank is entered in slot 44 between rebent portion 29 and the tracker arm face 32 at the base of the arm to prevent movement of the operating lever 33 beyond the normal position of rest of the bell crank under the weight of or pressure upon the flushing mechanism, whereby any tendency of operating lever 33 to swing towards the front of the stand 10 will be checked by engagement of terminal bearing 42 with the rebent portion 29.

The return portion 29 is of sufficient length to lie normally in the path of bearing 42 on operating arm 33 as shown in Figure 1, and is held from abnormal movement by engagement of lugs 45 on the arms of lower pan yoke 15 and abutments 46 in spaces 14 at the base of the stand 10 and limiting the drop of lower pan 16 under pressure from counterweight 27, as best shown in Figures 1 and 4. From its angle of repose, bell crank 34 is designed to move approximately 10° before lug 37 on arm 38 will engage crank arm 43 on upper pan shaft 35 to provide sufficient time for the lower pan 16 to close the hopper before dropping upper pan 36 as will presently appear.

Within this period, the operating lever 33 will have moved from the normal position indicated in Figure 1 to that shown in Figure 3, without communicating its movement to shaft 35 supporting the upper pan 36 since the bell-crank during this interval has swung idly upon its bearing 40. Throughout this movement of the bell crank 34, the upper pan, secured to polygonal portion 47 on the shaft, will have been held in its raised position by counterweight 48 secured to polygonal end portion 49 of the shaft by set screw 50 or the like.

It will be noted that counterweight 48 for the upper pan 36 extends to the side of the vertical axis of shaft 35 opposite from that of the pan, while lower pan 16 with its counterweight 27 move in the same general direction for a purpose hereinafter stated. As usual in hoppers of the type indicated, the shaft 35 for the upper pan is rotatably mounted in bearings 51 formed in stand 10 and the pan disposed between them, as best shown in Figure 4.

It will be noted that arm 38 of the bell-crank is provided with a stub shaft portion 52 projecting laterally from the arm to provide a journal and support for the flushing mechanism link 53 held thereon by pin 54. To the upper end of the link is fulcrumed the flushing lever 55 connected to valve mechanism in casing 56 supported from hopper bowl 57. To the free end of flushing lever 55 is secured the lifting rod 58 extending upwardly for operative connection with an actuating arm (not shown) secured to the wall adjacent the hopper in the usual manner.

Thus supported, and with the bell-crank 34 idly journaled upon shaft 35, the link 53 is held from continued downward movement by the engagement of terminal bearing 42 on the operating lever 33 with portion 29 on tracker arm 30 at closed end of slot 44, as shown in Figure 3. The impact of the engagement between said parts will jar loose the lower pan 16 from the discharge spout 11 should the pan fail to drop from any cause, the weight of link 53 and connected parts supplementing counterweight 27 to maintain lower pan 16 in the full open position shown in Figure 1.

To prevent possible chattering of the mechanism parts during car movement and to dampen the operating movements of the flushing mechanism, the tracker arm 30 is designed to bear yieldingly against the operating lever 33 as the latter traverses face 32 of the arm during the movement from the normal condition shown in Figure 1, to the dumping position indicated in Figure 2, the pressure thus exerted being derived from the expansive force of compressed spring 22 on yoke 15 supporting the lower pan 16, and transmitted through shaft 24 to the tracker arm.

It will be noted that the upper pan 36 may be pushed downwardly against the opposing counterweight 48 without actuating the operating mechanism parts or raising the lower pan. This movement will cause rotation of operating shaft 35 and with it the crank arm 43 on the shaft. The crank arm will move away from stop lug 37 on bell crank 34 until the pan has reached its full open position. This feature has particular value from a sanitation standpoint when the hoppers are to be cleaned with the aid of a hose whereby all matter and the flushing water will be permitted to escape thru both upper and lower openings simultaneously.

To prevent possible displacement of bowl 57 from any cause with consequent injury to the flushing mechanism, anchor bolts 59 are employed with their bent upper ends 60 entered in openings 61 in the upper sides of the bowl 57 as best shown in Figure 4, or looped over the tops of the bowl flange as indicated at 73 in broken lines in this figure. To seal openings 61 against escape of flushing water when the former method is used, the bent ends 60 are formed preferably with frustoconical terminal portions 62 nested against the inner ends of the respective openings with correspondingly shaped rubber gaskets 63 interposed to provide the water-seal.

It is desirable that the openings 61 be slightly larger than diameter of the bolts 59 to insure a positive and watertight bearing of gaskets 63 at openings 61 to compensate for slight variation in contour of bowl 57 or upper peripheral edge 64 of stand 10. As best shown in Figures 4 and 8, the anchor bolts are fitted with bearing shoes 65 having abutment faces 66 and 67 disposed at an angle with respect to each other and adapted to engage shouldered sockets 68 formed in the sides of stand 10 as shown in Figures 1 and 4.

The shoes are formed with sleeve portions 69 to loosely receive adjacent threaded ends of their respective bolts 59 and operatively held by clamping nuts 70 on the bolts. The bolts are made to interlock with the hopper stand by means of the dowels 71 on abutments 66 of the shoes 65 and adapted to be entered in suitable openings in shoulders 72 of sockets 68 to prevent disengagement of the parts during car movement.

The mechanism described provides a sanitary and efficient watercloset for passenger vehicle requirements, simple and rugged in design, is readily installed, and economically maintained.

What I claim is:—

1. In a water closet having a bowl, a supporting stand and a flushing valve, upper and lower dumping pans, valve operating mechanism controlling said pans, and lost motion devices permitting separate movement of said upper pan independently of said operating mechanism, flushing valve, and the lower pan.

2. In a water closet having a bowl, a supporting stand and a flushing valve, upper and lower dumping pans, valve operating mechanism controlling said pans, and lost motion devices between said valve and upper pan permitting separate movement of said pan independently of said operating mechanism, flushing valve, and the lower pan.

3. In a water closet having a bowl, a supporting stand and a flushing valve, upper and lower dumping pans having timed sequence of movement, valve operating mechanism controlling said pans, and lost motion devices associated with said valve and upper pan whereby separate movement of said pan is effected independently of said operating mechanism, flushing valve, and the lower pan.

4. In a water closet having a bowl, a supporting stand, and a flushing valve, upper and lower dumping pans, a shaft supporting the upper pan and operable to raise and lower said pan, valve operating mechanism, and lost motion devices on said shaft connecting said valve operating mechanism and pans whereby separate movement of the upper pan may be effected independently of said flushing valve.

5. In a water closet having a bowl, a supporting stand, and a flushing valve, upper and lower dumping pans, a shaft for supporting the upper pan normally raised, separate means holding the lower pan normally lowered, means loosely mounted upon said shaft for independently raising the lower pan and to permit said upper pan to be separately raised or lowered independently of the flushing valve, and operating mechanism connecting said last noted means and flushing valve.

6. In a water closet having a bowl, a supporting stand and a flushing valve, upper and lower dumping pans, valve operating mechanism, flushing valve, controlling said pans, a tracker lever for actuating said lower pan, a shaft for supporting the upper pan, and a bell-crank loosely mounted on said shaft and connecting said lever and operating mechanism.

7. In a water closet having a bowl, a supporting stand and a flushing valve, valve operating mechanism, upper and lower dumping pans, a crank shaft supporting the upper pan and mounted for rotation in one direction of movement independently of said operating mechanism, flushing valve, and lower pan, an actuating lever for the lower pan, and a bell-crank mounted for relative rotation on said shaft connecting said lever and operating mechanism.

8. In a water closet having a bowl, a supporting stand and a flushing valve, upper and lower dumping pans, valve operating mechanism controlling said pans, yoke mechanism pivotally supporting said lower pan and including a tracker lever extending upwardly from the yoke, a crank shaft supporting the upper pan movable independently of said flushing valve, and a bell-crank operatively mounted for relative rotation on said shaft and disposed with one of its arms depending and operatively engaging said tracker lever and having a relatively short arm connecting said shaft and operating mechanism.

9. In a water closet having a bowl, a supporting stand and a flushing valve, upper and lower dumping pans, valve operating mechanism controlling said pans, a crank shaft supporting the upper pan movable independently of said flushing valve, a yoke member pivotally mounted in said stand for supporting the lower pan, a tracker lever extending normally upward from said yoke, and a bell-crank operatively mounted for relative rotation upon said shaft having one of its arms connecting said valve operating mechanism and shaft and a relatively longer arm normally depending from said shaft when the lower pan is in its normal lowered position and movable to slidably engage said lever to raise said pan.

10. In a water closet having a bowl, a supporting stand and a flushing valve, valve operating mechanism, upper and lower dumping pans, a shaft supporting the upper pan and mounted for rotation in one direction of movement independently of said operating mechanism, flushing valve, and the lower pan, a crank arm on said shaft, and a bell-crank mounted for relative rotation upon said shaft having one of its arms engageable with said crank arm and operating mechanism and an operating lever controlling said lower pan.

11. In a water closet having a bowl, a supporting stand and a flushing valve, valve operating mechanism, upper and lower dumping pans controlled by said operating mechanism, a tracker arm for actuating said lower pan, a shaft for supporting the upper pan movable independently of said flushing valve, a bell-crank loosely mounted on said shaft and having one of its arms engaging said operating mechanism and a relatively long operating lever engageable with said tracker arm, and a stop portion on said tracker arm for preventing abnormal movement of said operating lever under pressure of the valve operating mechanism.

12. In a water closet having a bowl, a supporting stand, and a flushing valve, upper and lower dumping pans, valve operating mechanism controlling said pans, a shaft for supporting the upper pan, a tracker lever for actuating said lower pan, and a bell-crank connecting said lever and operating mechanism and mounted for relative rotation on said shaft, said bell-crank having one of its arms adapted upon rotation of said shaft to engage said tracker lever to raise and subsequently lock said lower pan closed.

13. In a water closet having a bowl, a supporting stand, and a flushing valve, upper and lower dumping pans, valve operating mechanism controlling said pans, a shaft for supporting the upper pan, a tracker lever for actuating said lower pan, a yoke member rigidly movable with said lever, and a spring carried by said yoke for resiliently supporting said lower pan.

In witness whereof I have hereto set my hand this 29th day of October, 1930.

CLARENCE H. JOHNSON.